(12) United States Patent
Bartelt et al.

(10) Patent No.: US 12,151,837 B2
(45) Date of Patent: Nov. 26, 2024

(54) AUTOMATED STRING CHEESE PACKAGING SYSTEM

(71) Applicant: Leprino Foods Company, Denver, CO (US)

(72) Inventors: Joshua Bartelt, Highlands Ranch, CO (US); Jim Volk, Brush, CO (US); Roy Markvicka, Lincoln, NE (US); Ron Cantwell, Arvada, CO (US); Sanket Khedkar, Arvada, CO (US); Liam Taylor, Denver, CO (US); Mark Carmer, Parker, CO (US)

(73) Assignee: Leprino Foods Company, Denver, CO (US)

( * ) Notice: Subject to any disclaimer, the term of this patent is extended or adjusted under 35 U.S.C. 154(b) by 125 days.

(21) Appl. No.: 18/103,303

(22) Filed: Jan. 30, 2023

(65) Prior Publication Data

US 2024/0253835 A1     Aug. 1, 2024

(51) Int. Cl.
*B65B 25/06* (2006.01)
*B65B 37/18* (2006.01)
*B65B 37/20* (2006.01)
*B65B 57/10* (2006.01)
*B65G 47/46* (2006.01)

(52) U.S. Cl.
CPC ............ *B65B 25/068* (2013.01); *B65B 37/18* (2013.01); *B65B 57/10* (2013.01); *B65G 47/46* (2013.01); *B65B 2210/06* (2013.01); *B65G 2201/0202* (2013.01)

(58) Field of Classification Search
CPC ....... B65B 25/068; B65B 25/06; B65B 37/16; B65B 37/18; B65B 37/20; B65B 13/00; B65B 19/00; B65B 19/02; B65B 19/04; B65B 27/10; B65B 35/30; B65B 35/46; B65B 57/02; B65B 57/20; B65B 57/10
See application file for complete search history.

(56) References Cited

U.S. PATENT DOCUMENTS

| | | | | |
|---|---|---|---|---|
| 3,584,697 A | * | 6/1971 | Danielson | B65B 1/32 177/59 |
| 3,593,837 A | * | 7/1971 | Loomis, Jr. | B65B 35/30 198/448 |
| 3,626,953 A | * | 12/1971 | Korber | A24C 5/3424 53/236 |
| 3,932,983 A | * | 1/1976 | Hughes | B65B 61/24 53/529 |

(Continued)

*Primary Examiner* — Gloria R Weeks
(74) *Attorney, Agent, or Firm* — Kilpatrick Townsend & Stockton LLP (57) ABSTRACT

The present technology is generally directed to methods and systems for automated food packaging. The method and system includes singulating a plurality of elongate food products into a plurality of individual product pieces, conveying the plurality of individual product pieces along a moving surface, depositing a portion of the individual product pieces into a bucket, where the products are deposited such that a length of greater than about 90% of the individual product pieces are generally aligned parallel with the first side or second side of the bucket. Methods and systems include measuring a height between a top surface of the deposited portion of produce pieces and a top side of the moving surface, vertically lowering the bucket if the measured height is less than a threshold amount, and depositing a second portion of individual product pieces into the vertically lowered bucket.

20 Claims, 7 Drawing Sheets

(56) References Cited

U.S. PATENT DOCUMENTS

| | | | | | |
|---|---|---|---|---|---|
| 4,095,391 | A | * | 6/1978 | Anguiano | B65B 27/10 100/9 |
| 4,152,976 | A | * | 5/1979 | Kawasaki | A21C 9/04 426/292 |
| 4,386,490 | A | * | 6/1983 | Griffith | B65B 19/34 53/247 |
| 4,578,927 | A | * | 4/1986 | Scarpa | B65B 57/06 53/506 |
| 4,586,313 | A | * | 5/1986 | Maglecic | B65B 37/20 53/437 |
| 4,586,314 | A | * | 5/1986 | Monge | B65B 19/34 53/251 |
| 4,678,047 | A | * | 7/1987 | Kataoka | B65B 37/18 177/1 |
| 5,544,515 | A | * | 8/1996 | Zwiechowski | B65B 19/10 53/151 |
| 5,822,952 | A | * | 10/1998 | Boldrini | B65B 19/105 53/151 |
| 6,141,943 | A | * | 11/2000 | Hart | B65B 5/106 198/418.6 |
| 6,202,392 | B1 | * | 3/2001 | Greenwell | B65B 25/141 53/566 |
| 7,581,634 | B2 | * | 9/2009 | Hart | B65G 47/5127 198/429 |
| 7,757,462 | B2 | * | 7/2010 | Harrison | B65B 5/12 198/418.6 |
| 8,458,995 | B2 | * | 6/2013 | Harrison | B65B 5/108 198/418.6 |
| 8,708,002 | B2 | * | 4/2014 | Malenke | B65B 37/005 141/2 |
| 2006/0137296 | A1 | * | 6/2006 | Long | B65B 25/145 53/473 |
| 2010/0223886 | A1 | * | 9/2010 | Sugioka | B65G 69/16 53/248 |
| 2017/0029142 | A1 | * | 2/2017 | Evans | B65B 1/36 |
| 2018/0348047 | A1 | * | 12/2018 | Belair | G01G 19/393 |
| 2019/0389605 | A1 | * | 12/2019 | DesJardin | B65B 3/06 |
| 2022/0106066 | A1 | * | 4/2022 | Kuhn | B65B 65/006 |

\* cited by examiner

AUTOMATED STRING CHEESE PACKAGING SYSTEM

FIELD

The present technology relates to systems and methods for packaging elongate products, such as elongate food products, in a highly aligned configuration and with high efficiency.

BACKGROUND

In the production of food products, it is often desired to package food products in bulk without individual packaging. For instance, commercial settings are often capable of utilizing an entire case of various food products in a period of time such that individual product wrapping is not necessary. Further, there is increased consumer demand for bulk packaging in efforts to reduce packaging waste. However, current bulk packaging systems suffer from various deficiencies. Namely, conventional packaging systems can be difficult or even impossible to clean to the extent necessary for handling raw food.

In addition, conventional systems exhibit limited functionality for efficient and accurate packaging. Particularly with raw food products, efficient packaging, such as highly aligned arrangements, can only be achieved with full to partial hand and/or robot packaging. However, such methods cannot achieve packing speeds necessary for current demands. Moreover, it is ever more important to identify and test the electrical components, not only individually performing but also as a whole-compatible-system to achieve the necessary speeds of packaging. These and other challenges are addressed by the present technology.

BRIEF SUMMARY

Embodiments of the present technology are generally directed to methods for automated food packaging. The methods include singulating a plurality of elongate food products into a plurality of individual product pieces. The methods include conveying the plurality of individual product pieces along a moving surface. The methods include depositing a portion of the individual product pieces into a bucket having a first side, a second side opposed to the first side, and a tamper disposed between and generally perpendicular to the first side, the second side, or both the first side and the second side. Embodiments include where the products are deposited such that a length of greater than about 90% of the individual product pieces are generally aligned parallel with the first side of the bucket, the second side of the bucket, or both the first side and the second side of the bucket. The methods include measuring a height between a top surface of the deposited portion of produce pieces and a top side of the moving surface. The methods also include vertically lowering the bucket if the measured height is less than a threshold amount and depositing a second portion of individual product pieces into the vertically lowered bucket.

In embodiments, the methods include where the individual product pieces are conveyed at a speed such that the length of greater than about 75% of the individual product pieces extend within less than or about 25 degrees from parallel to a first moving surface side or a second moving surface side. In more embodiments, the methods include where the individual product pieces are generally aligned such that the length of greater than about 90% of the individual product pieces extends within less than or about 10 degrees from parallel to the first side or second side of the bucket. In further embodiments, the methods include where the plurality of individual product pieces each have a length extending from a first end to a second end, a width extending from a first side to a second side, and a length to width aspect ratio of about 2:1 to about 100:1. In additional or alternative embodiments, the threshold amount is less than 50% of an individual product piece length.

Moreover, in embodiments, the moving surface is divided into at least a first channel and a second channel, where each channel contains at least one sensor disposed at an end of each channel adjacent to the bucket, where each sensor measures a section height in the bucket adjacent to the respective channel. In embodiments, the vertical lowering of the bucket occurs when any respective section height is less than the threshold amount. Moreover, in some embodiments, the methods further include transferring the individual product pieces from the bucket to a container. In embodiments, the transferring includes translating a bottom of the bucket from a closed position to an open position. In further embodiments, the methods include preselecting a target weight, where the opening occurs automatically when a weight of individual product pieces disposed in the bucket is within about 5% of the preselected target weight. In yet more embodiments, the bucket is vertically lowered by a height that is about 0.9 times to about 20 times the individual product piece width.

In embodiments, the plurality of elongate food products includes a frozen dairy product. In more embodiments, the frozen dairy product has a circular cross-section. In additional or alternative embodiments, the individual product pieces are not disposed in individual packaging.

Methods also include tamping the first end of the second end of the individual product pieces prior to transferring the individual product pieces. In embodiments, the methods include transferring up to about 4,000 pounds of individual product pieces to one or more containers per hour. In more embodiments, the methods include transferring at least about 1,000 pounds of individual product pieces to one or more containers per hour. Moreover, in embodiments, the methods include depositing about 300 to about 900 individual product pieces per minute into the bucket. Furthermore, in embodiments, the length of each individual product piece is about 90% to about 99.9% of a width of the container. In embodiments, the methods include cleaning the moving surface, sensors, bucket, or a combination thereof, after transferring the individual product pieces.

Embodiments of the present technology are also generally directed to automated food packaging systems. The systems include a feed ramp, a moving surface, a bucket, and a controller. The feed ramp is configured to separate one or more elongate food products into a plurality of individual product pieces. In the systems, the moving surface includes one or more dividers extending parallel to at least a first moving surface side or a second moving surface side, and also includes a plurality of sensors. The bucket has a first side, a second side opposite the first side, and a tamper disposed between the first side and the second side and generally perpendicular to the first side, the second side, or both the first side and the second side, and a weight sensor. In the systems, the controller is configured to convey the plurality of individual product pieces along the moving surface, deposit a portion of the individual product pieces into the bucket, measure a height between a top surface of the deposited portion of product pieces and a top side of the moving surface, vertically lower the bucket if the measured height is less than a threshold amount, and deposit a second portion of individual product pieces into the vertically lowered bucket. Furthermore, in systems, the portion of individual product pieces are deposited in the bucket such that a length of greater than about 90% of the individual product pieces are generally aligned parallel with the first side of the bucket, the second side of the bucket, or both the first side and the second side of the bucket. Also, in systems, the controller continuously monitors and controls, health and status of electrical components such as sensing devices, speed control of moving devices and mechanical assemblies.

In embodiments, the bucket includes a bottom having a semi-circular shape with a curvature of about ½ to about 1/18. In more embodiments, the controller is configured to open the bucket bottom when a weight of the individual product pieces is within about 5% of a preselected weight. In further embodiments, the bucket defines a perimeter along the first side, a third side, the second side, and an inner lip. When opened, the bucket bottom is disposed fully outward of the bucket perimeters. In embodiments, the feed ramp, the moving surface, the bucket, or a combination thereof are formed from a non-porous food-safe material. Additionally, or alternatively, in embodiments, the non-porous food-safe material is a stainless steel.

Furthermore, in embodiments, the threshold amount is from about 0.5 inches to about 6 inches. In more embodiments, the threshold amount is from about 1 inch to about 4.5 inches. In yet further embodiments, the preselected weight is from about 5 pounds to about 50 pounds. In additional or alternative embodiments, the preselected weight is from about 10 pounds to about 20 pounds. In embodiments, the moving surface includes at least two additional dividers, forming a plurality of channels, where each channel includes at least one sensor of the plurality of sensors. In some embodiments, each sensor is an ultrasonic sensor. In more embodiments, the feed ramp, the moving surface, the bucket, and each sensor are each formed from, or enclosed in, a non-porous food-safe material. Furthermore, in embodiments, any food-contact surface of the automated food packaging system is formed from, or enclosed in, a non-porous food-safe material. In embodiments, the automated food packaging system is configured to package a frozen dairy product having a circular cross-section and an aspect ratio of about 2:1 to about 100:1.

BRIEF DESCRIPTION OF THE DRAWINGS

A further understanding of the nature and advantages of selected embodiments of the present technology may be realized by reference to the remaining portions of the specification and the drawings wherein like reference numerals may be used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION

Conventional systems for packaging elongate food products typically include one or more feed streams that provide the elongate food product to a conveyer belt or line. After reaching the conveyor, an individual or robot removes one or more products from the conveyor and places the one or more products into a container, such as a shipping container. However, such conventional processes exhibit unfavorable processes conditions for efficient packing. For instance, when utilizing an individual or robot packer, container weights tend to vary greatly, such as greater than 7%, or even greater than 10% from a target container weight, as the packer fills the container until it appears full, without regard for the total weight of product. A large variance in case weight can be problematic for shipping and product consistency. In addition, individual or robot packers are unable to obtain high packing speeds, such as about 300 pieces per minute or greater, or 1,000 pounds packed per hour or more, due to limitations on grabbing and packing the product, which results in low efficiency. Furthermore, individual or robot packers also lead to food safety concerns, as the individual and/or robot introduce contact points that are not food safe and/or difficult to clean surfaces and geometries.

Moreover, additional problems are observed when products that require high levels of alignment are packaged. For instance, in order to provide stability and efficiency, it is desired to package products into containers having volumes that closely align with the volume of product to be packaged. This can cause difficulties when packaging elongate products having high length to width/diameter aspect ratios, as the elongate products tend to have a varied alignment (e.g., where a portion of the elongate products are not generally parallel to one another, or to a container side), particularly when packed quickly. The varied alignment can create many problems, such as low container weights, or an inability to close a container lid when a proper weight is achieved, due to the low packing density from misaligned pieces. Furthermore, additional problems may be observed when the product is a food product that is packaged in a frozen state. For instance, even a small number of misaligned product pieces, such as even about 10% or less, can cause deformation of the remaining product pieces when the container is defrosted.

The present technology overcomes these issues by providing automated food packaging methods and systems that can quickly, efficiently, and accurately package an food product. Namely, the methods and systems according to the present technology have surprisingly found that by utilizing a unique combination of preselected apparatus elements, speeds, and continuously evaluated drop heights, fully automated packaging systems and methods may be provided that can quickly package even elongate food products with a high degree alignment. Furthermore, as the systems provided herein are fully automated (e.g., does not include a human intervention step), the systems may have at least a portion, if not all, of the food contact surfaces be formed from a food contact safe material, and/or a material that can be easily and completely cleaned as necessary.

Figure 1:
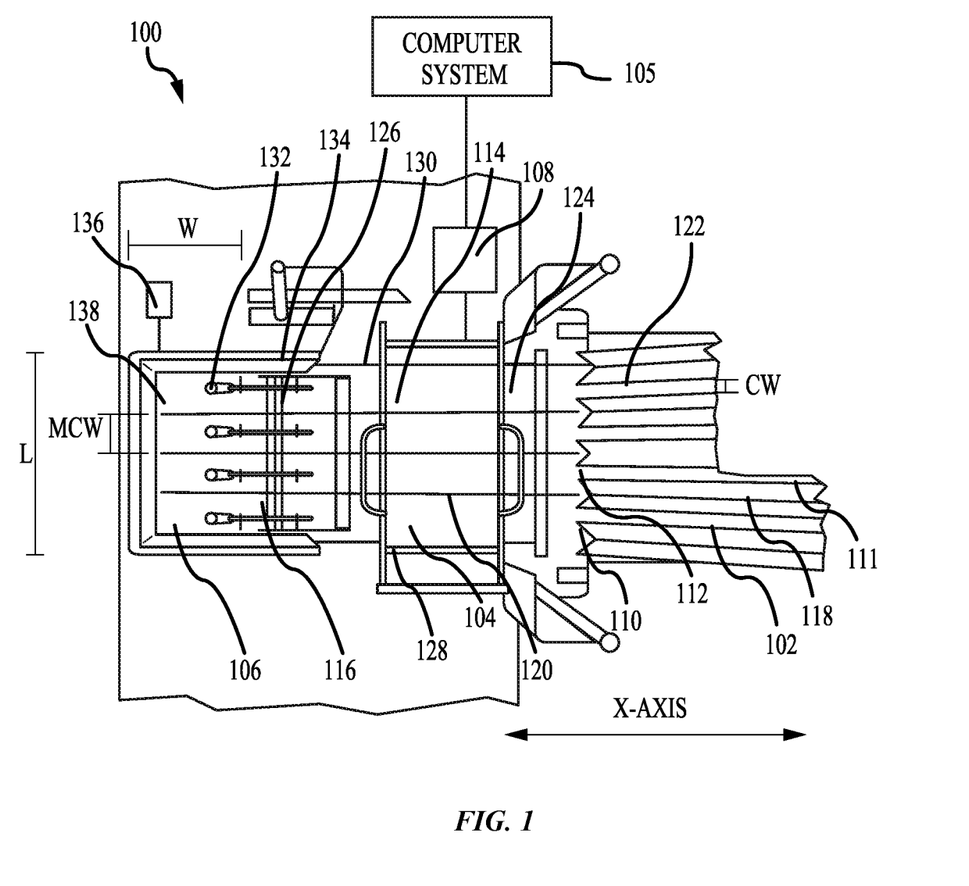
FIG. 1 is a top perspective view of an automated food packaging system according to embodiments of the present technology.

For instance, FIG. 1 illustrates a top view of an automated food packaging system 100 according to embodiments of the present technology. The automated food packaging system may be specifically configured to implement aspects or operations according to embodiments of the present technology. For instance, automated food packaging system 100 may be configured to package highly aligned elongate food products according to embodiments of the present technology. The automated food packaging system may include a feed ramp 102, a moving surface 104, a bucket 106, and a controller 108. As illustrated, the feed ramp 102 may be adjacent to, or even connected to, a first end 110 of a moving surface 104. Namely, it should be understood that, in embodiments, a second end 112 of feed ramp 102 may be disposed vertically above the first end 110 of moving surface 104, or directly adjacent to the first end 110 of moving surface 104, such that elongate food products may be transferred smoothly from feed ramp 102 to moving surface 104, without elongate food products escaping from the system. Moreover, as illustrated, a second end 126 of moving surface 104 may be disposed adjacent to the bucket 106. As will be discussed in greater detail below, the second end 126 of the moving surface 104 may be disposed substantially adjacent to an inner lip 116 of bucket 106 in a first position, and may be disposed adjacent to horizontally, but vertically above inner lip 116 when the bucket 106 is in one or more lowered configurations (e.g., disposed adjacent to a vertically extending plane formed by the inner lip 116 and vertically above inner lip 116). Thus, in this way, an elongate food product may be deposited smoothly from moving surface 104 into bucket 106.

As noted, the operation of the automated food packaging system 100 may be controlled by a controller 108. The controller 108 may include any device or combination of devices configured to implement the operations described below. Accordingly, the controller 108 may be or be connected to a computer system and/or processor 105 (shown more clearly in FIG. 6) or array of controllers and/or a general purpose computer configured with software stored on a non-transitory, computer-readable medium that, when executed, may perform the operations described in relation to methods according to embodiments of the present technology. Each of the feed ramp 102, moving surface 104, and bucket 106 may be configured to perform one or more process steps in the methods for packaging that will be discussed herein.

As illustrated in FIG. 1, in embodiments, the feed ramp 102, moving surface 104, or both the feed ramp 102 and moving surface 104 may contain one or more dividers 118, 120, respectively. For instance, in the illustrated embodiment, the feed ramp 102 and/or moving surface 104 may contain three dividers 118, 120. However, it should be understood that, in embodiments, the number of dividers 118, 120 may be varied based upon a length L of bucket 106. Thus, in embodiments, the moving surface 104 and/or feed ramp 102 may have one or more dividers, such as two or more dividers, such as three or more dividers, such as four or more dividers, such as five or more dividers, such as six or more dividers, or any ranges or values therebetween.

Thus, in embodiments, the feed ramp 102 and/or moving surface 104 may contain a number of channels 122, 124 respectively, equal to the number of dividers in the moving surface 104 or feed ramp 102 plus one. For instance, in the illustrated embodiment, each of the moving surface 104 and feed ramp 102 contain four channels 122, 124. Of course, it should be understood that, in embodiments, the number of channels 122, 124 may vary based upon the length L of bucket 106. Thus, in embodiments, the moving surface 104 and/or feed ramp 102 may have two or more channels, such as three or more channels, such as four or more channels, such as five or more channels, such as six or more channels, such as seven or more channels, or any ranges or values therebetween.

Nonetheless, in embodiments, feed ramp 102 may be configured to separate or singulate one or more elongate food products into a plurality of individual product pieces. For instance, in embodiments, one or more dividers 118 may be shaped or spaced apart so as to separate elongate food product piece from an adjacent elongate food product piece as the elongate food products enter feed ramp 102. For instance, as illustrated in FIG. 1, the dividers 118 may define a channel 122 having a semi-circular cross-section, a semi-oval cross-section, an inverse pyramidal cross-section, a conical cross-section, or the like.

Additionally or alternatively, the one or more dividers 118 may be spaced apart such that only a portion of the elongate food products may enter the respective channel 122 at any given time. For instance, in embodiments, the dividers 118 may be spaced apart and shaped so as to define a channel 122 having a channel width Cw between two consecutive dividers 118. The channel width may have a width along at least a portion of the channel that is relative to a width of an elongate food product, such as a ratio of channel width to elongate food product width of about 1:1 to about 5:1, such as about 1.1:1 to about 4.5:1, such as about 1.2:1 to about 4:1, such as about 1.3:1 to about 3.5:1, such as about 1.4:1 to about 3:1, such as about 1.5:1 to about 2:1, or any ranges or values therebetween. However, it should be understood that, in embodiments, the channel may initially have a larger width (such as near first end 111), which may taper to a smaller width as the channel 122 approaches second end 112. Regardless, in embodiments, the channel width may taper from a larger width to a smaller width, where the larger and/or smaller width may be according to any one or more of the above ranges.

In embodiments, the feed ramp 102 may be configured to vibrate, shake, bounce, or the like, in order to singulate the elongate food products. It should be understood that, in embodiments, the feed ramp 102 may vibrate, shake, or bounce alone or in combination with embodiments of the channel shape and size discussed above. Nonetheless, the feed ramp 102 may have a first end 111 and a second end 112, and a length extending therebetween. In embodiments, the second end 112 is disposed horizontally adjacent to a first end 110 of moving surface 104. Moreover, in embodiments, the second end 112 may be disposed vertically above first end 110, such that, an individual product piece moving along feed ramp 102 to moving surface 104 may be disposed on moving surface 104 from feed ramp 102. Thus, in embodiments, the difference in height between a second end of feed ramp 102 and the upper surface 114 (shown more clearly in FIG. 5A) of moving surface 104, may be a height such that a ratio of the difference in height between the second end 112 of feed ramp 102 and upper surface 114 of moving surface 104 to elongate food product length is less than or about 0.5:1, such as less than or about 0.4:1, such as less than or about 0.3:1, such as less than or about 0.25:1, such as less than or about 0.2:1, such as less than or about 0.15:1, or any ranges or values therebetween.

As further illustrated in FIG. 1, the moving surface 104 may have a length that generally extends from a first end 110 adjacent to feed ramp 102 to a second end 126 adjacent to bucket 106. As discussed above, the moving surface 104 may have one or more dividers 120. However, unlike dividers 118 of feed ramp 102, the dividers 120 may have a generally vertically straight cross-section, such as a line, block, pillar, column, or the like, and have a small width. Furthermore, the dividers 120 may extend from a first end 110 of the moving surface towards the second end 126. However, as illustrated, in embodiments, dividers 120 may extend horizontally past second end 126 and overhang all or a portion of bucket 106.

Nonetheless, in embodiments, the moving surface 104 may have a first side 128 and an opposed second side 130 that may be generally parallel to first side 128. As shown, in embodiments, at least one divider 120 may extend in a generally linear fashion from the first end 110 to the second end 126. In addition, in embodiments, one or more dividers 120 may be generally parallel to the first side 128, second side 130, or both the first side 128 and second side 130. For instance, in embodiments, one or more dividers 120 extend in a linear fashion such that the length direction of the one or more dividers 120 extends within less than or about 25 degrees from parallel to a first moving surface side and/or a second moving surface side, such as less than or about 22.5 degrees, such as less than or about 20 degrees, such as less than or about 17.5 degrees, such as less than or about 15 degrees, such as less than or about 12.5 degrees, such as less than or about 10 degrees, such as less than or about 7.5 degrees, such as less than or about 5 degrees, such as less than or about 2 degrees, such as less than or about 1 degree, or any ranges or values therebetween.

Moreover, in embodiments, the dividers 120 may be spaced apart and shaped so as to define a channel 124 having a moving surface channel width Mcw between consecutive dividers of the one or more dividers 120. Due at least in part to the shape of dividers 120, moving surface 104 may define a larger channel width Mcs than feed ramp 102 channel width Cw. The moving surface channel width may have a width along at least a portion of the channel of that is relative to a width of an elongate food product, such as a ratio of channel width to elongate food product width of about 1:1 to about 10:1, such as about 1.5:1 to about 7.5:1, such as about 2:1 to about 5:1, or any ranges or values therebetween.

Regardless of the orientation of the divider(s) 120 and/or sides 128, 130, the moving surface 104 may be a continuous conveyor, such as a conveyor belt, for example an endless or closed-loop conveyor belt, or any other type of continuous conveying apparatus. Nonetheless, the present disclosure has found that by conveying the moving surface, and therefore the plurality of individual product pieces, (which will be discussed in greater detail below) at a minimum speed or greater, not only is packing speed improved, but the ability of the moving surface to "pull" the individual product piece into a position such that a major axis (e.g., a length), of the individual product piece (which will be discussed in greater detail in regard to FIG. 5) is generally parallel to a divider 120, the first side 128, and/or second side 130. Thus, while the speed may generally depend upon the size and aspect ratio of the elongate food product, in embodiments, the moving surface 104 may move at a speed of greater than or about 200 feet per minute, such as greater than or about 250 feet per minute, such as greater than or about 300 feet per minute, such as greater than or about 325 feet per minute, such as greater than or about 350 feet per minute, such as greater than or about 375 feet per minute, such as greater than or about 400 feet per minute, or any ranges or values therebetween.

In embodiments, the moving surface includes one or more sensors 132. In the illustrated of FIG. 1, each of the four moving surface channels 124 may contain at least one sensor 132. However, it should be understood that, in embodiments, the number of channels 124 and sensors 132 may be varied based upon the length L of bucket 106, the size of the elongate product, the target weight of the packaged elongate product, and the like. Thus, in embodiments, the moving surface 104 may have one or more sensors, such as two or more sensors, such as three or more sensors, such as four or more sensors, such as five or more sensors, such as six or more sensors, or any ranges or values therebetween. Nonetheless, as illustrated, it should be clear that the sensors are positioned adjacent to a second end 126 of the moving surface 104, such that the one or more sensors 132 can detect a distance from an upper surface of the bucket 106 (which may be bucket bottom 138 and/or a surface of a deposited portion of individual product pieces) to an upper surface 114 of the moving surface 104. Thus, in embodiments, while the one or more sensors 132 may be attached to a frame 134 at a second end 126 of the moving surface 104, the sensors 132 themselves may extend over the bucket, and may therefore be disposed vertically above bucket 106. Thus, it should be clear that, sensors 132 as discussed herein may have a frame 134 mounted substantially adjacent or vertically above a second end 126, but may, in embodiments, extend vertically above bucket 106.

Regardless of the number of sensors utilized, in embodiments, the one or more sensors 132 may be configured to measure a distance between two surfaces or may be a proximity sensor. Thus, in some embodiments, one or more sensors 132 may be an ultrasonic sensor, and IR proximity sensor, a laser distance sensor, a radar sensor, combinations thereof, or the like. Nonetheless, in one aspect, at least one of the sensor(s) 132 is an ultrasonic sensor. In a further embodiment, each sensor 132 is an ultrasonic sensor.

Returning again to FIG. 1, bucket 106 may be disposed adjacent to second end 126, such that a plurality of product pieces may be deposited into bucket 106 from moving surface 104. Bucket 106 contains a weight sensor 136 for measuring a weight of product pieces deposited into bucket 106. Weight sensor 136 may be connected to controller 108 for immediate and automatic detection of a weight of deposited product, and automatic stoppage of feed ramp 102 and moving surface 104, and/or transfer of the individual product pieces from bucket 106, when the weight reaches a preselected weight. For instance, unlike conventional systems where the package weights vary widely from preselected weights, systems and methods discussed herein may automatically stop depositing individual product pieces into bucket 106 when the bucket 106 registers a weight that is less than about 10% from a target weight, such as less than or about 7.5%, such as less than or about 5%, such as less than or about 4%, such as less than or about 3%, such as less than or about 2%, such as less than or about 1% from a preselected target weight, or any ranges or values therebetween. In embodiments, the preselected weight may be from about 5 pounds to about 50 pounds, such as from about 7.5 pounds to about 35 pounds, such as from about 10 pounds to about 20 pounds, or any ranges or values therebetween.

Thus, a resulting container packaged with the product contained in the bucket, can have a weight within very narrow weight ranges from a preselected weight.

Nonetheless, bucket 106 is shown in a closed position in FIG. 1. Namely, bucket bottom 138 is illustrated in a closed position, ready for accepting deposited individual product pieces from moving surface 104. The closed position of bucket bottom 138 may be shown more clearly in FIGS. 2A and 2C, and the open position in FIGS. 2B and 2D.

Figure 2A:
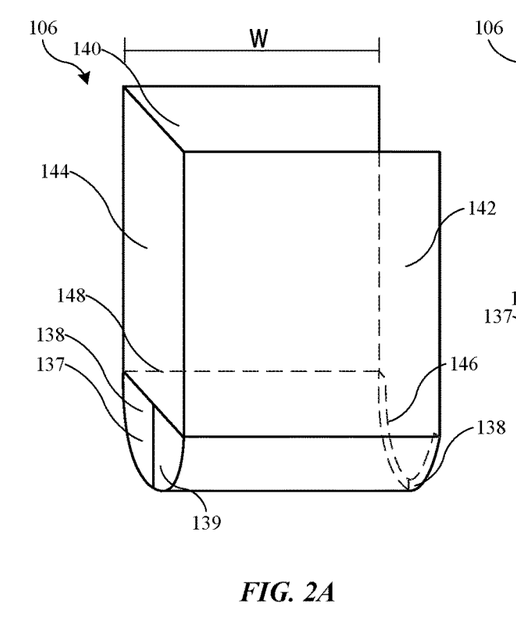
FIG. 2A is a side perspective view of a bucket in a closed position according to embodiments of the present technology.
Figure 2B:
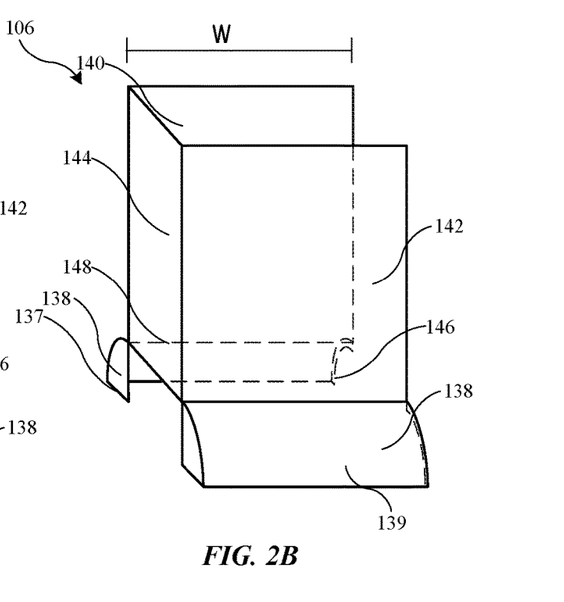
FIG. 2B is a side perspective view of a bucket in an open position according to embodiments of the present technology.
Figure 2C:
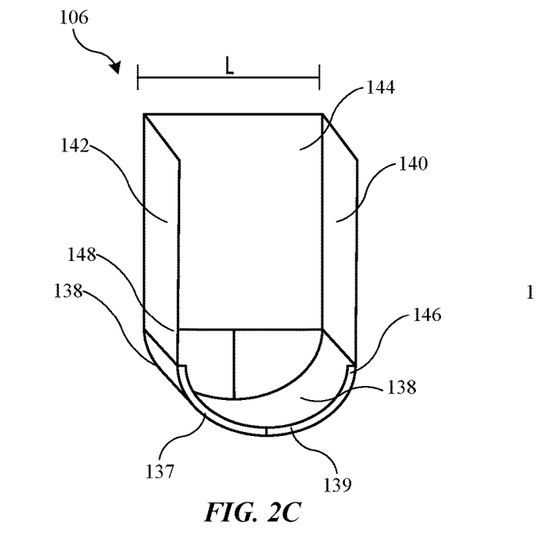
FIG. 2C is a front perspective view of a bucket in a closed position according to embodiments of the present technology.

For instance, referring to FIG. 2A which shows a side perspective view of bucket 106 and FIG. 2C which shows a front perspective view of bucket 106, the bucket 106 has a first side 140, second side 142, third side 144, and inner lip 146. While it may be clear from the discussion herein, inner lip 146 may be disposed adjacent to the second end 126 of moving surface 104 so as to receive one or more individual product pieces from moving surface 104. In addition, while inner lip 146 is shown extending slightly above bucket base frame 148, in embodiments, the inner lip 146 may be generally coplanar with bucket base frame 148. Moreover, as shown, the bucket 106 may have a width W generally extending in the direction of movement of moving surface 104 (e.g., along the x-axis illustrated in FIG. 1), and a length L extending generally perpendicular to the direction of movement.

While the bucket 106 may have any length and width as desired, in embodiments, the bucket length and width may correspond with a length and width of a desired container, such as a container for packaging and shipping individual product pieces. Thus, in embodiments, the width of the bucket and/or container (shown more clearly in FIGS. 4A-D) may be within about 10% of a length of product to be packaged, such as within about 9%, such as withing about 8%, such as withing about 7%, such as within about 6%, such as within about 5%, such as within about 4%, such as within about 3%, such as within about 2% of a length of an individual product piece, or any ranges or values therebetween.

As shown in FIGS. 2A and 2C most clearly, bucket bottom 138 may include one or more sections 137, 139, and may, in embodiments, have a non-flat cross-sectional shape that extends vertically below base frame 148. For instance, in embodiments the bucket bottom may have a semi-circular or semi-oval shape extending vertically below base frame 148. Namely, the present disclosure has surprisingly found that a non-flat bucket bottom, such as a circular cross-sectional bottom, may further improve the alignment of elongate product pieces when deposited into bucket 106. Thus, while the exact radius of curvature of the bucket bottom 138 may vary based upon the size of the product pieces to be deposited, in embodiments, the bucket bottom may have a curvature, defined as 1/radius of a circle that fits the curve of the bucket base 138 most snugly, of greater than or about $\frac{1}{18}$, such as greater than or about $\frac{1}{16}$, such as greater than or about $\frac{1}{14}$, such as greater than or about $\frac{1}{12}$, such as greater than or about $\frac{1}{10}$, such as greater than or about $\frac{1}{8}$, such as greater than or about $\frac{1}{6}$, such as greater than or about $\frac{1}{4}$, such as up to about $\frac{1}{2}$, or any ranges or values therebetween.

Figure 2D:
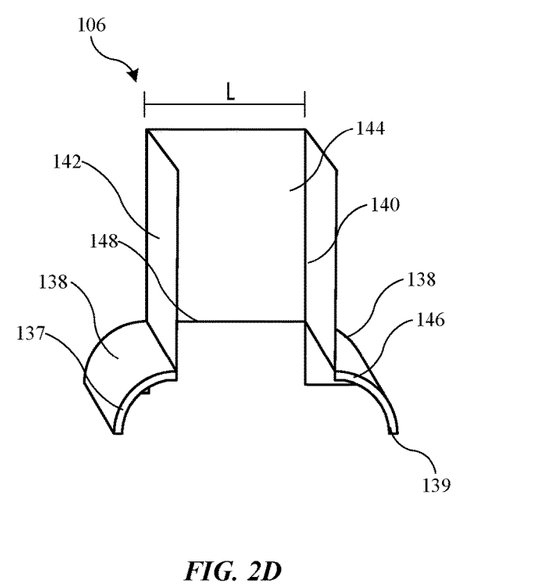
FIG. 2D is a front perspective view of a bucket in an open position according to embodiments of the present technology.

Nonetheless, FIG. 2B, illustrates a side perspective view of the bucket 106, and FIG. 2D illustrates a front perspective view of bucket 106, where both FIGS. 2B and 2D illustrate the bucket 106 with a bottom 138 in an open position. As illustrated, bottom 138 may be formed from two or more sections 137, 139, such that the bottom 138 may transition to an open position. In embodiments, the bucket 106 may automatically transition to an open position when the preselected weight is reached. However, as will be discussed in greater detail in regards to FIGS. 5A-5D, in embodiments, a tamper may contact inner lip 146 prior to transitioning to an open position after the preselected weight is registered. Namely, while shown more clearly in FIG. 5C, a tamper may be disposed between and generally perpendicular to a first side 140 and an opposed second side 142 of a bucket 406. Namely, the tamper may be coupled with or below moving surface 104 so as to be disposed generally adjacent to and perpendicular to inner lip 146. Thus, in embodiments, a tamper may be configured to tamp a first or second end of a plurality of individual product pieces deposited in bucket 106 in order to further align or maintain alignment of the individual product pieces as the individual product pieces are transferred from bucket 106 to one or more containers. However, as will be illustrated in greater detail in FIG. 5C, the tamper may only be aligned with an inner lip 146 when the bucket 106 is in one or more vertically lowered positions.

In addition, as shown, the bottom 138 may be configured to be disposed fully outside of bucket 106 when in the open position. Namely, such a configuration may further improve the alignment of product pieces in the container, by allowing the alignment achieved in the bucket to be maintained during transfer from the bucket 106 to the container (FIG. 5D). Thus, in embodiments, the first side 140, second side 142, third side 144, and inner lip 146 may define a bucket perimeter. When in the open position, all or a portion of the bucket bottom 138 may be disposed even with, or outward of the bucket perimeter, so as not to impede transfer of individual product pieces from the bucket 106 to a container.

Figure 3:
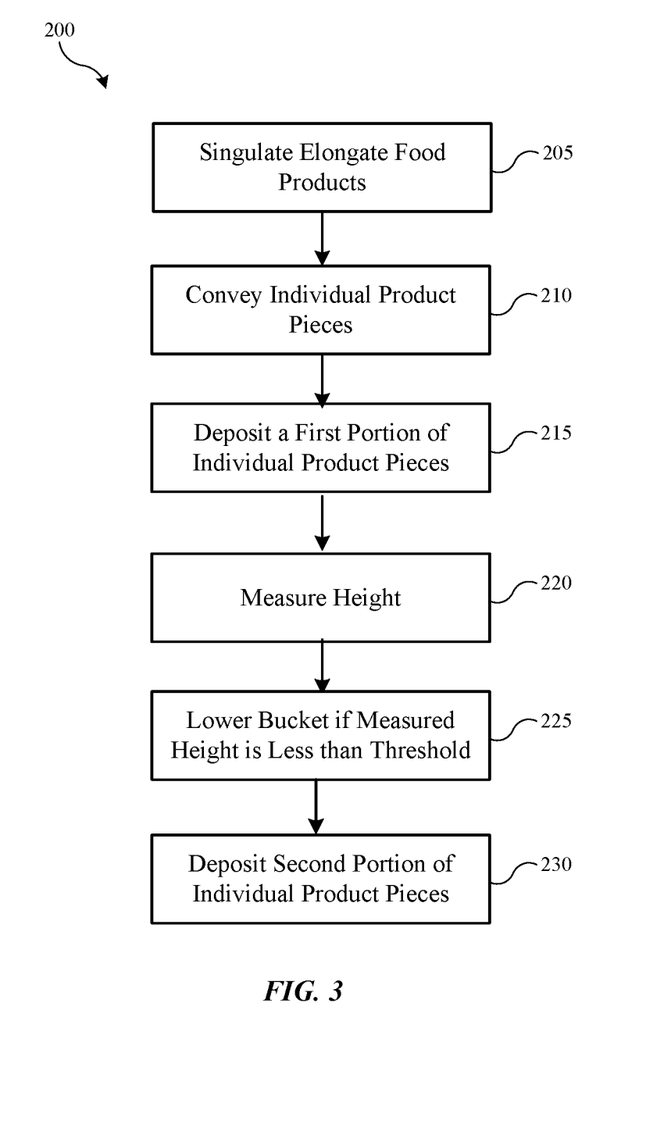
FIG. 3 shows selected operations in a method for automated food packaging according to embodiments of the present technology.

FIG. 3 illustrates selected operations of an automated food packaging method 200. Method 200 may include one or more operations prior to the initiation of the method, including front end processing, sorting, cleaning, or any other operations that may be performed prior to the described operations. For example, in some embodiments, a food product may be prepared and frozen utilizing an IQF freezing method. For example, many of the operations are described in order to provide a broader scope of the method and system, but are not critical to the technology, or may be performed by alternative methodology as will be discussed further below. Method 200 describes operations shown schematically in FIGS. 4A and 4B and FIGS. 5A-5D, the illustrations of which will be described in conjunction with the operations of method 200. While FIGS. 4A and 4B, and FIGS. 5A-5D may contain simplified reference characters in order to show method 200 clearly, it should be understood that, in embodiments, FIGS. 4A and 4B, and FIGS. 5A-5D may contain any one or more embodiments discussed above in regards to FIGS. 1-2D. It is to be understood that the figures illustrate only partial schematic views, and a method or system may contain aspects as illustrated in the figures, as well as alternative structural aspects that may still benefit from aspects of the present technology.

Figure 4A:
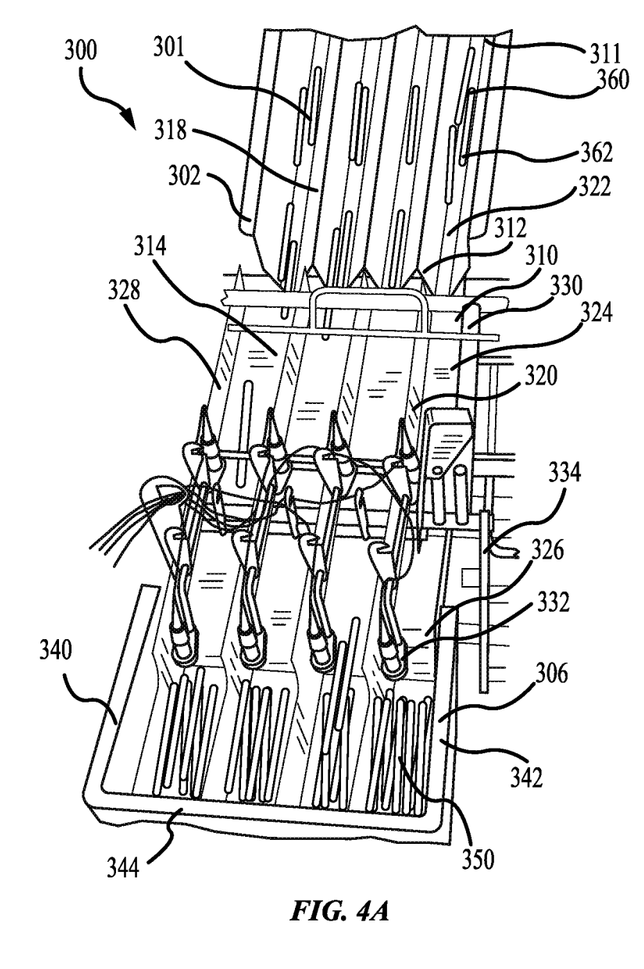
FIGS. 4A and 4B illustrate a top-end perspective view of an automated food packaging system according to embodiments of the present technology.
Figure 4B:
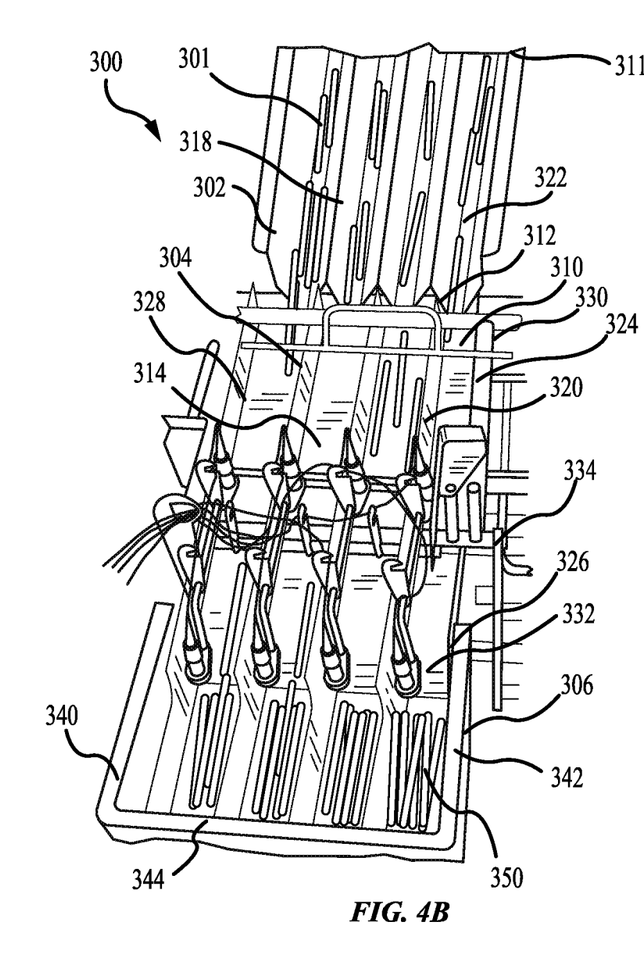

Method 200 may involve optional operations to package a plurality of individual product pieces in a highly aligned manner. Nonetheless, operation 205 may include singulating or separating a plurality of elongate food products 301 into a plurality of individual product pieces 301. As shown in FIGS. 4A and 4B, operation 205 may be conducted on feed ramp 302 and/or moving surface 304 of an automated packaging system 300. Namely, as illustrated, the elongate food product may enter the feed ramp 302 clumped together in groups of multiple pieces. However, between the shape of channels 322 formed by dividers 318, vibration of feed ramp 302, and/or the speed of moving surface 304, the elongate food product may be singulated or separated into individual product pieces 301.

Nonetheless, individual product pieces 301 may drop or be translated from a second end 312 of feed ramp 302 that is opposite first end 311, to first end 310 of moving surface 304. Thus, at operation 210, the individual product pieces 301 may be conveyed along moving surface 304, such as within one or more channels 324. As discussed above, the present disclosure has found that by utilizing a sufficiently high speed for moving surface 304, the individual product pieces may be "pulled" from the second end 312 of feed ramp 302 into an orientation where the major axis, or length, of the individual product pieces may be substantially aligned with the direction of movement.

For example, in embodiments and as discussed above, the moving surface 304 may have a first side 328 and an opposed second side 330 that may be generally parallel to first side 328. As shown, at least one divider 320 may extend in a generally linear fashion from the first end 310 to the second end 326 of moving surface 304. In addition, one or more dividers 320 may be generally parallel to the first side 328, second side 330, or both the first side 328 and second side 330. In embodiments, the individual product pieces are conveyed at a speed such that the length of greater than about 75%, such as greater than or about 80% such as greater than or about 85%, such as greater than or about 90%, such as greater than or about 95%, such as greater than or about 99%, or any ranges or values therebetween, of the individual product pieces extends within less than or about 25 degrees from parallel to a first moving surface side 328 and/or a second moving surface side 330, such as less than or about 22.5 degrees, such as less than or about 20 degrees, such as less than or about 17.5 degrees, such as less than or about 15 degrees, such as less than or about 14 degrees, such as less than or about 13 degrees, such as less than or about 12 degrees, such as less than or about 10 degrees, such as less than or about 9 degrees, such as less than or about 8 degrees, or any ranges or values therebetween.

Regardless of the speed utilized, at operation 210, the individual product pieces 301 are conveyed from a first end 310 of the moving surface 304 to a second end 326. At the second end, a first portion of individual product pieces 301 may be deposited into bucket 306 at operation 215. As illustrated, bucket 306 may contain a first side 340, second side 342, and third side 344. One or more sensors 332 disposed on frame 334 attached adjacent to second end 326 of moving surface 304 may extend vertically above bucket 306 and may measure a height between a bucket 306 bottom (FIGS. 2A-2D 138 or FIGS. 5A-5D 438) or a top surface 350 of the deposited product pieces 301 and a top surface 314 of moving surface 304, at operation 220.

Nonetheless, as illustrated, the deposited individual product pieces 301 extend largely in a direction of movement such that a length, or major axis of the plurality of individual product pieces 301, is substantially aligned with the first side 340 and/or second side 342 of bucket 306. For instance, in embodiments, the individual product pieces are generally aligned in bucket 306 such that the length of greater than about 75%, such as greater than or about 80% such as greater than or about 85%, such as greater than or about 90%, such as greater than or about 95%, such as greater than or about 97.5%, such as greater than or about 99% or any ranges or values therebetween, of the individual product pieces extends within less than or about 15 degrees from parallel to first side 340 and/or second side 342 of bucket 306, such as less than or about 12.5 degrees, such as less than or about 10 degrees, such as less than or about 7.5 degrees, such as less than or about 5 degrees, such as less than or about 4 degrees, such as less than or about 3 degrees, such as less than or about 2 degrees, such as less than or about 1 degree, or any ranges or values therebetween. While various embodiments of the present technology have been discussed that provide such a high degree of alignment, further discussion of the remaining technology may provide further embodiments for providing the high degree of alignment according to the present technology.

Figure 5A:
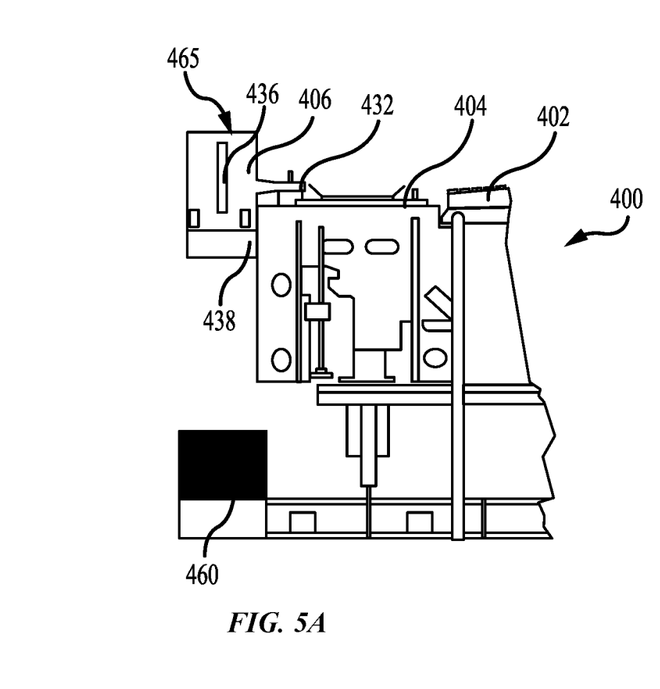
FIGS. 5A to 5D illustrate side perspective views of an automated food packaging system according to embodiments of the present technology.
Figure 5B:
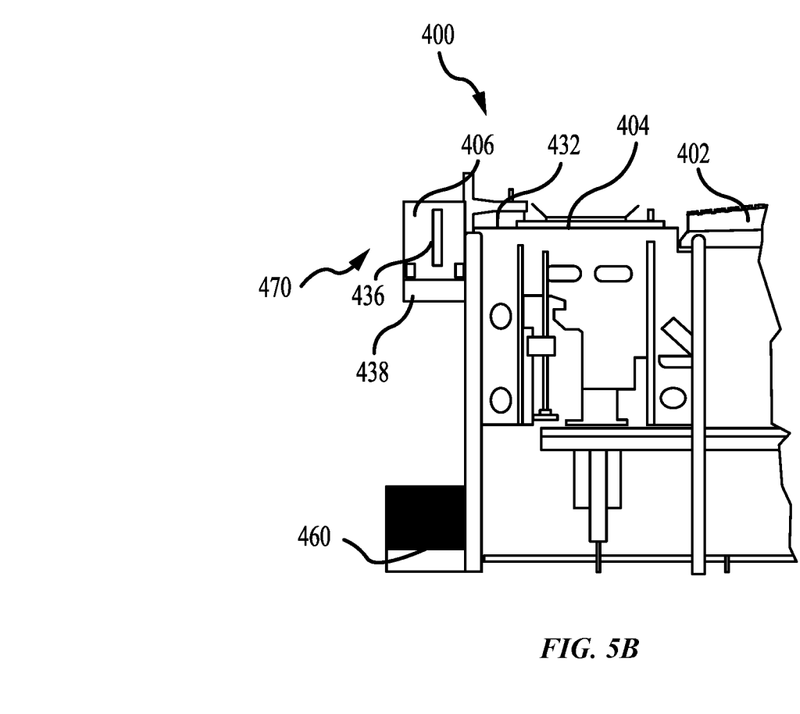
Figure 5C:
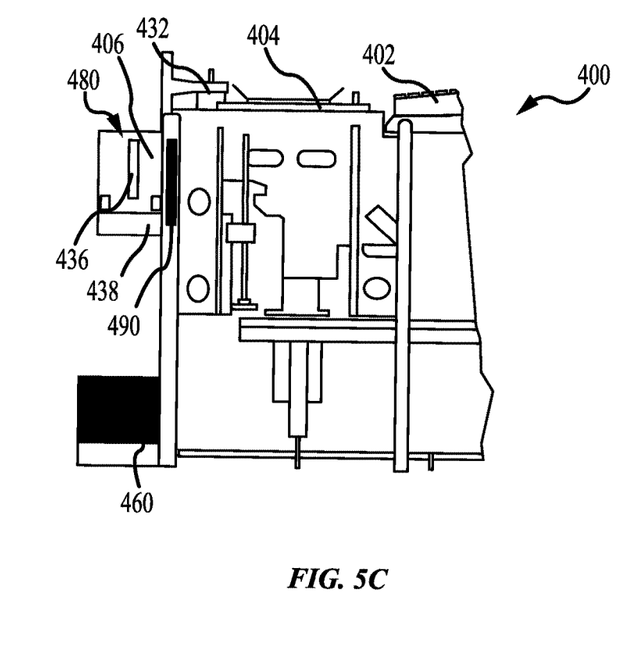
Figure 5D:
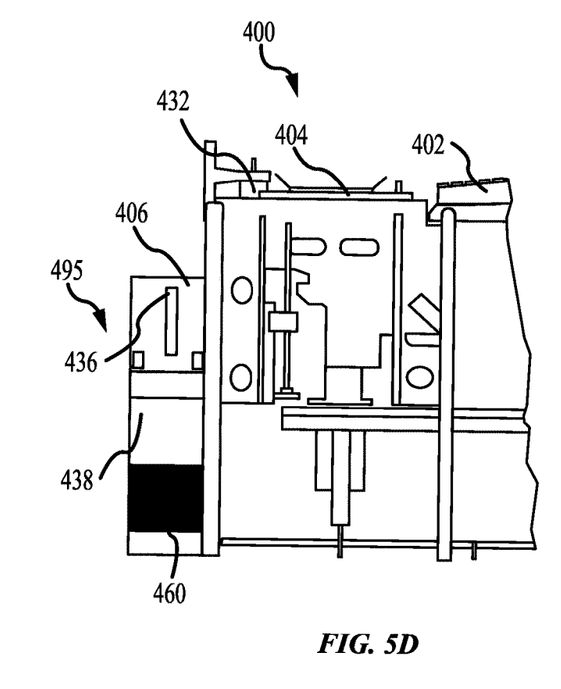

Nonetheless, operation 225 may be better illustrated by FIGS. 5A to 5D. For instance FIGS. 5A to 5D illustrate an automated packaging system 400 having a feed ramp 402, moving surface 404, bucket 406, one or more sensors 432, weight sensor 436, and container 460. FIG. 5A shows an automated packaging system 400 with a bucket 406 in an initial position configured to receive a first portion of individual product pieces 301. During the deposit of the first portion of individual product pieces 301 at operation 215, sensors 432 are measuring the height between the top surface 350 of the deposited product pieces 301 and a top surface 314 of moving surface 304, at operation 220. If a threshold value is measured, controller 108 may be configured to vertically lower the bucket 406.

For instance, as illustrated in FIG. 5B, bucket 406 may be disposed vertically below the original bucket 406 position 465, in a second vertical position 470. After vertically lowering the bucket at operation 225, a second portion of individual product pieces 301 may be deposited onto the first plurality of individual product pieces 301 at operation 230. While, in some embodiments, the targeted weight may be reached after one vertical lowering (which would initiate automated transfer to container 460), in embodiments, operations 220 and 225 may be repeated until the bucket contains a number of deposited product pieces sufficient to reach a preselected weight of individual product pieces as discussed above.

Thus, as illustrated in FIG. 5C, the preselected weight has not been reached, and a second height measurement was taken and was below a threshold value, so bucket 406 was vertically lowered from a second vertical position 470 to a third vertical position 480. After vertically lowering bucket 406 into third vertical position 480, a third portion of individual product pieces 301 are deposited into bucket 406. In the illustrated embodiment, the third portion of individual product pieces trigger the automatic weight sensor 436. Thus, as the third portion of individual product pieces have deposited a total weight of individual product pieces within the accepted preselected weight tolerance, controller 208 may stop feed ramp 402 and/or moving surface 404, tamp a first end of the individual product pieces adjacent to the inner lip 146 with a tamper 490, vertically lower the bucket 406 into a fourth vertical position (which may also be referred to as a transfer position) 495, and transition the bucket bottom 438 from the closed position (illustrated in FIGS. 5A to 5C), into the open position shown in FIG. 5D. When the bucket bottom 438 transitions from the closed position to the open position, the individual product pieces may be transferred from the bucket 406 into container 460. Surprisingly, the individual product pieces may exhibit a highly aligned orientation in container 460, such as any one or more orientations discussed above. Moreover, while operations 220, 225, and 230 were repeated three times in the illustrated embodiments, it should be clear that in embodiments, only one plurality of deposited product pieces may be utilized according to the present method, such as two pluralities or more, such as three pluralities or more, such as four pluralities or more, such as five pluralities or more, such as six pluralities or more, as necessary to achieve a preselected weight while maintaining excellent packing alignment.

Namely, the present technology has found that the threshold height value also contributes to the surprisingly high degree of alignment achieved herein. Namely, the present technology has found that when the threshold amount is less than about 50% of an individual product piece's length (such as a length extending from a first end 360 to a second end 362 of an individual product piece), such as less than or about 47.5%, such as less than or about 45%, such as less than or about 42.5%, such as less than or about 40%, such as less than or about 35%, such as less than or about 30%, or any ranges or values therebetween. Namely, the present technology has found that by utilizing such a threshold amount, elongate food products will align horizontally and generally parallel to one or more bucket sides, whereas higher height values provide product pieces that tend to stack on their minor axis (e.g. on an end of an individual product piece), and topple onto a major axis in uneven alignments. Moreover, in embodiments, the vertical lowering may be triggered when any sensor 332 senses a value below a threshold value.

Nonetheless, in embodiments, if a threshold value is triggered, the bucket 360/460 may be vertically lowered by an amount that is at least about 0.9 times a width of an individual product piece, such as greater than or about 1 times a width of an individual product pieces, such as greater than or about 1.1 times, such as greater than or about 1.5 times, such as greater than or about 2 times, such as greater than or about 3 times, such as greater than or about 4 times, such as greater than or about 5 times, such as greater than or about 10 times, such as greater than or about 15 times, such as greater than or about 20 times, or any values or ranges therebetween.

As discussed above, in embodiments, the individual product pieces are elongate food products that may not be disposed in any individual wrapping. Thus, the present technology has also found that by utilizing systems and methods as discussed herein, any or all product contacting surfaces may be formed from, or enclosed in, a food-safe material. For instance, the feed ramp, moving surface, dividers, and/or the bucket may be formed from a non-porous food-safe material. Additionally or alternatively, sensors, may be encased in a non-porous food-safe material that does not interfere with the distance measurement. In embodiments, the non-porous food-safe material may be a metal, such as stainless steel, a silicone, or any other suitable polymeric material. Furthermore, due to materials used, the entire automated packaging system may be cleaned regularly, such as by rinsing, scrubbing, washing, or the like. Thus, in embodiments, the methods discussed herein may include an optional washing step after transferring one or more buckets of individual product pieces to one or more containers.

As noted above, in addition to the high degree of alignment and packing weight efficiency, the methods and systems according to the present technology is also capable of providing much faster and more efficient packaging than conventional systems. For instance, the present technology may be configured to transfer at least about 1,000 pounds of individual product pieces into one or more buckets and/or containers per hour, such as greater than or about 1,250 pounds, such as greater than or about 1,500 pounds, such as greater than or about 1,750 pounds, such as greater than or about 2,000 pounds, such as greater than or about 2,250 pounds, such as greater than or about 2,500 pounds, such as greater than or about 2,750 pounds, such as greater than or about 3,000 pounds, such as greater than or about 3,250 pounds, such as greater than or about 3,500 pounds, such as greater than or about 4,000 pounds of individual product pieces per hour or any ranges or values therebetween.

Stated differently, the methods and systems discussed herein may be configured to deposit at least about 300 product pieces into a bucket and/or container per minute, such as greater than or about 350 product pieces, such as greater than or about 400, such as greater than or about 450, such as greater than or about 500, such as greater than or about 550, such as greater than or about 600, such as greater than or about 650, such as greater than or about 700, such as greater than or about 750, such as greater than or about 800, such as greater than or about 850, such as greater than or about 900 product pieces per minute, or any ranges or values therebetween.

Furthermore, due at least in part to the high degree of alignment, the containers packaged herein may display a high degree of packing efficiency. For instance, in embodiments, a container defines an interior volume (e.g., when the container is a quadrilateral, a volume defined by the four sides, a top side, and a bottom side), and where the individual product pieces occupy at least about 80 vol. % of the interior volume, such as greater than or about 85 vol. %, such as greater than or about 90 vol. %, such as greater than or about 92.5 vol. %, such as greater than or about 95 vol. %, or any ranges or values therebetween.

In embodiments, the automated food packaging system and methods discussed herein may be suitable for use with a variety of individual product pieces. In embodiments, the individual product pieces may be a food product, such as any one or more elongate food products. In embodiments, the elongate food product may have a length to weight aspect ratio of at least about 2:1, such as greater than or about 3:1, such as greater than or about 4:1, such as greater than or about 5:1, such as greater than or about 7:1, such as greater than or about 10:1, such as greater than or about 12:1, such as greater than or about 14:1, such as greater than or about 16:1, such as greater than or about 18:1, such as greater than or about 20:1, such as greater than or about 25:1, such as greater than or about 30:1, such as greater than or about 35:1, such as greater than or about 50:1, up to about 100:1, or any ranges or values therebetween.

For instance, in embodiments, an elongate food product may have a length of greater than or about 2 inches, such as greater than or about 2.5 inches, such as greater than or about 3 inches, such as greater than or about 3.5 inches, such as greater than or about 4 inches, such as greater than or about 4.5 inches, such as greater than or about 5 inches, such as greater than or about 5.5 inches, such as greater than or about 6 inches, such as greater than or about 6.5 inches, such as greater than or about 7 inches, such as greater than or about 7.5 inches, such as greater than or about 8 inches, such as greater than or about 8.5 inches, such as greater than or about 9 inches, such as greater than or about 9.5 inches, such as greater than or about 10 inches, such as greater than or about 10.5 inches, such as greater than or about 11 inches, such as greater than or about 11.5 inches, such as greater than or about 12 inches, or any ranges or values therebetween.

An elongate food product may have a width or diameter of greater than or about 0.1 inches, such as greater than or about 0.2 inches, such as greater than or about 0.3 inches, such as greater than or about 0.4 inches, such as greater than or about 0.5 inches, such as greater than about 0.6 inches, such as greater than or about 0.7 inches, such as greater than or about 0.8 inches, such as greater than or about 0.9 inches, such as greater than or about 1 inch, or any ranges or values therebetween.

Thus, in embodiments, a threshold value may be greater than or about 0.5 inches, such as greater than or about 1 inch, such as greater than or about 1.5 inches, such as greater than or about 2 inches, such as greater than or about 2.5 inches, such as greater than or about 3 inches, such as greater than or about 3.5 inches, such as greater than or about 4 inches, such as greater than or about 4.5 inches, such as greater than or about 5 inches, such as greater than or about 5.5 inches, such as greater than or about 6 inches, or any ranges or values therebetween.

Furthermore, as noted above, due to the high degree of alignment between respective product pieces, the length of the individual product pieces may be very close to a width value of a container. For instance, a length of each individual product piece may be greater than or about 90% of a width of a container, such as greater than or about 91%, such as greater than or about 92%, such as greater than or about 93%, such as greater than or about 94%, such as greater than or about 95%, such as greater than or about 96%, such as greater than or about 97%, such as greater than or about 98%, such as greater than or about 99%, up to about 99.9% of a width of a container, or any ranges or values therebetween.

In embodiments, the systems and methods discussed herein may be suitable for packaging an elongate food product. The elongate food product may have a circular, semi-circular, oval, quadrilateral, including square and rectangular, triangular, diamond, pentagon, hexagon, heptagon, octagon, star, or crescent-shaped cross-section, combinations thereof, or the like. In embodiments, the elongate food product may be a diary product, such as a frozen dairy product. In embodiments, the frozen dairy product may be a frozen cheese product, suitable for incorporation into pizzas or as string cheese products. However, while the individual product pieces have so far been described as food pieces, it should be understood that, in embodiments, the methods and systems according to the present technology may be suitable for packaging other elongate products.

Figure 6:
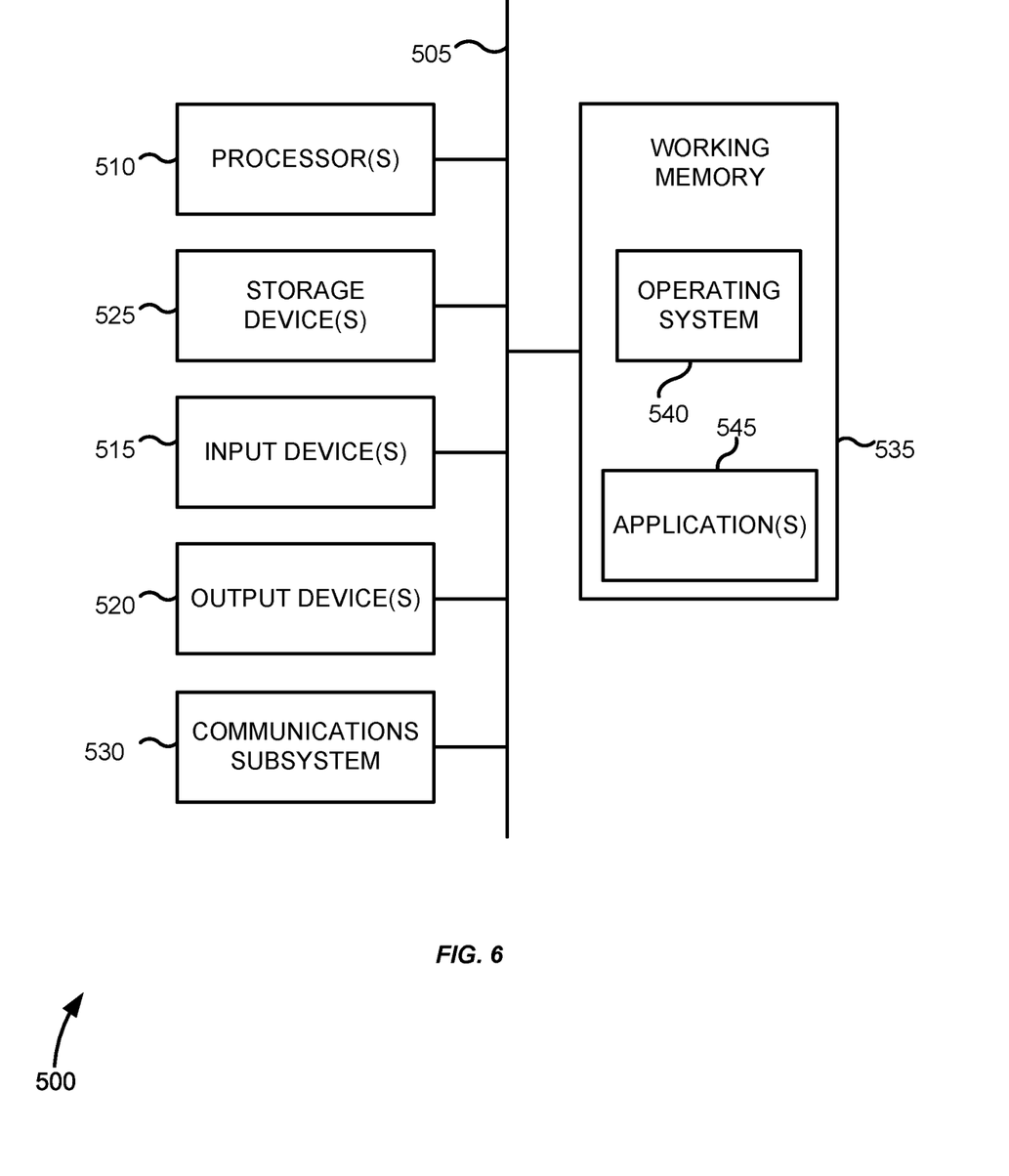
FIG. 6 is a block diagram of a computing system according to an embodiment of the present invention.

Nonetheless, as illustrated in FIG. 6, in embodiments, the systems and methods may be executed fully or in part by a processor which may be incorporated as part of the previously described controller 108 and/or processor 105. For example, computer system 500 can represent some of the components of a controller or computer system described herein. FIG. 6 provides a schematic illustration of one embodiment of a computer system 500 that can perform the methods provided by various other embodiments, as described herein. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 500 is shown including hardware elements that can be electrically coupled via a bus 505 (or may otherwise be in communication, as appropriate), which may also be connected with controller 108. The hardware elements may include a processing unit 510, including without limitation one or more processors, such as one or more central processing units (CPUs), graphical processing units (GPUs), special-purpose processors (such as digital signal processing chips, graphics acceleration processors, and/or the like); one or more input devices 515, which can include without limitation a keyboard, a touchscreen, receiver, a motion sensor, a camera, a smartcard reader, a contactless media reader, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 530 may permit data to be exchanged with a network (such as the network described below, to name one example), other processors, and/or any other devices described herein. In many embodiments, the processor 500 will further comprise a non-transitory working memory 535, which can include a RAM or ROM device, as described above.

The computer system 500 also can also include software elements, shown as being currently located within the working memory 435, including an operating system 540, device drivers, executable libraries, and/or other code, such as one or more application programs 545, which may include processor programs provided by various embodiments, and/or may be designed to implement methods, and/or configure systems, provided by other embodiments, as described herein. Merely by way of example, one or more procedures described with respect to the method(s) or systems discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 400 and/or might take the form of source and/or installable code, which, upon compilation and/or installation on the computer system 500 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire, and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processing unit 510 and controller 108.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either limit of the range, both limits of the range, or neither limit of the range are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a food product" includes a plurality of such food products, and reference to "the bucket" includes reference to one or more buckets and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

The invention claimed is:

1. A method for automated food packaging, comprising singulating a plurality of elongate food products into a plurality of individual product pieces;
conveying the plurality of individual product pieces along a moving surface;
depositing a portion of the individual product pieces into a bucket, the bucket having a first side, a second side opposed to the first side, and a tamper disposed between the first side and second side and generally perpendicular to the first side, the second side, or both the first side and the second side of the bucket, such that a length of greater than about 90% of the individual product pieces are generally aligned parallel with the first side, the second side, or both the first side and the second side of the bucket;
measuring a height between a top surface of the deposited portion of product pieces and a top side of the moving surface;
vertically lowering the bucket if the measured height is less than a threshold amount; and
depositing a second portion of individual product pieces into the vertically lowered bucket.

2. The method of claim 1, wherein the individual product pieces are conveyed at a speed such that the length of greater than about 75% of the individual product pieces extends within less than or about 25 degrees from parallel to a first moving surface side or a second moving surface side.

3. The method of claim 1, wherein the individual product pieces are generally aligned such that the length of greater than about 90% of the individual product pieces extends within less than or about 10 degrees from parallel to the first side or second side of the bucket.

4. The method of claim 1, wherein the plurality of individual product pieces each have the length extending from a first end to a second end, a width extending from a first side to a second side, and a length to width aspect ratio of about 2:1 to about 100:1.

5. The method of claim 4, further comprising transferring the individual product pieces from the bucket to a container.

6. The method of claim 5, wherein the transferring comprises translating a bottom of the bucket from a closed position to an open position.

7. The method of claim 6, the method further including preselecting a target weight, wherein the translating from the closed position to an open position occurs automatically when a weight of individual product pieces disposed in the bucket is within about 5% of the preselected target weight.

8. The method of claim 5, further comprising transferring up to about 4,000 pounds of individual product pieces to one or more containers per hour.

9. The method of claim 8, further comprising transferring at least about 1,000 pounds of individual product pieces to one or more containers per hour.

10. The method of claim 5, wherein the length of each individual product piece is about 90% to about 99.9% of a length of the container.

11. The method of claim 5, further comprising cleaning the moving surface, sensors, bucket, or a combination thereof, after transferring the individual product pieces.

12. The method of claim 4, wherein the bucket is vertically lowered by a height that is about 0.9 times to about 20 times the individual product piece width.

13. The method of claim 4, the method further comprising tamping the first end or the second end of the individual product pieces prior to transferring the individual product pieces.

14. The method of claim 1, wherein the threshold amount is less than 50% of an individual product piece length.

15. The method of claim 14, wherein the moving surface is divided into at least a first channel and a second channel, wherein each channel contains at least one sensor disposed at an end of each channel adjacent to the bucket, wherein each sensor measures a section height in the bucket adjacent to the respective channel.

16. The method of claim 15, wherein the vertical lowering of the bucket occurs when any respective section height is less than the threshold amount.

17. The method of claim 1, wherein the plurality of elongate food products comprises a frozen dairy product.

18. The method of claim 17, wherein the frozen dairy product has a circular, semi-circular, oval, quadrilateral, triangular, diamond, pentagon, hexagon, heptagon, octagon, star, crescent-shaped cross-section, or combinations thereof.

19. The method of claim 1, wherein the individual product pieces are not disposed in individual packaging.

20. The method of claim 1, further comprising depositing about 300 to about 900 individual product pieces per minute.

* * * * *